United States Patent [19]
Herbault

[11] Patent Number: 5,165,032
[45] Date of Patent: Nov. 17, 1992

[54] PROCESS AND DEVICE FOR HIERARCHIZED ACCESS TO A NETWORK FOR TRANSMISSION OF INFORMATION

[75] Inventor: Patrick Herbault, Paris, France

[73] Assignees: Automobiles Peugeot, Paris; Automobiles Citroen, Neuilly sur Seine, both of France

[21] Appl. No.: 462,753

[22] Filed: Jan. 10, 1990

[30] Foreign Application Priority Data

Jan. 24, 1989 [FR] France ............... 89 00823

[51] Int. Cl.⁵ .................................... G06F 13/00
[52] U.S. Cl. ................. 395/725; 364/DIG. 1; 364/242.7; 364/242.92; 364/242.94; 364/264.4; 364/264.5; 364/284.4; 370/85.6
[58] Field of Search .............. 370/85, 85.6, 85.1; 364/200 MS File, 900 MS File; 395/725

[56] References Cited

U.S. PATENT DOCUMENTS

| | | | |
|---|---|---|---|
| 4,071,908 | 1/1978 | Brophy et al. | 364/900 |
| 4,715,031 | 12/1987 | Crawford et al. | 370/85 |
| 5,063,561 | 11/1991 | Kimmo | 370/85.2 |

FOREIGN PATENT DOCUMENTS 0217571 4/1987 European Pat. Off.
WO84/02629 7/1984 PCT Int'l Appl.

OTHER PUBLICATIONS

Carl K. Fenger, "Bus Links Peripherals, Multiple Masters in Low-Speed Network," EDN, Apr. 3, 1986, pp. 153-162.
IEEE Transactions on Consumer Electronics, vol. CE-27, No. 1, Feb. 1981, pp. 102-116, Kaplinsky, "The D2B A On Logical Wire Bus For Consumer Applications".

Primary Examiner—Eddie P. Chan
Attorney, Agent, or Firm—Burns, Doane, Swecker & Mathis

[57] ABSTRACT

A device for hierarchized access to a network for transmission of information by response in a communication frame, from stations connected to this network, including a counter (62) of bits transmitted on the network, connected to an input of a comparison block (63) for comparing the number of bits transmitted on the network with a characteristic value for the access ranking allocated to this station, the comparison block being connected to a transmission block (68) from the station in order to authorize the transmission of information on the network by this station when the number of bits transmitted on the network is at least equal to the characteristic value allocated to the station.

6 Claims, 4 Drawing Sheets

PROCESS AND DEVICE FOR HIERARCHIZED ACCESS TO A NETWORK FOR TRANSMISSION OF INFORMATION

BACKGROUND OF THE INVENTION

1. Field of the Invention

The present invention relates to a process for hierarchized access to a network for transmission of information by response in a communication frame, from stations connected to this network, and a device for the implementation of this process, which are applicable in particular in the automobile industry.

2. Description of the Related Art

Processes for transmission of information by response in a communication frame involve at least one of the stations connected to the network transmitting a start of message frame, also called a header, and in that according to this message header, another station accesses the network in order to transmit the end of the message frame containing in particular event or data information from this station.

These processes for transmission have already been described within the framework of a multi-master multi-slave network.

SUMMARY OF THE INVENTION

An aim of the present invention is to propose a generalization of this process to a process for hierarchized access so that each station can have a ranking for access to the network.

To this end, the subject of the invention is a process for hierarchized access to a network for transmission of information by response in a communication frame, from stations connected to this network, the inventive process involving each station connected to the network being allocated a ranking characteristic for ranking access to the network, this ranking characteristic for access being the number of bits already transmitted by another station connected to the network before the station concerned can access this network in order to transmit its own information.

According to another feature, the subject of the invention is also a device for the implementation of the process described above.

BRIEF DESCRIPTION OF THE DRAWINGS

The invention will be better understood with the aid of the following description which is given solely by way of example and with reference to the attached drawings, in which.

DETAILED DESCRIPTION OF THE PREFERRED EMBODIMENTS

Figure 1:
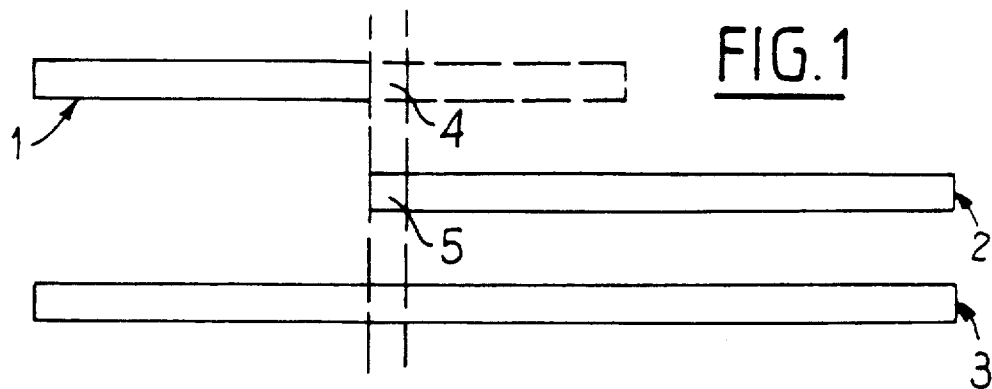
FIG. 1 illustrates a process for transmission of information by response in the message frame.

As can be seen in FIG. 1, a process for transmission of information in a network for communication between a number of stations, by response in the frame, involves at least one of the stations connected to this network transmitting a start of message, also called a header 1, and according to this message header, another station accesses the network in order to transmit the end of the message frame 2 containing event or data information from this station.

Thus, for example, a slave station recognizes the message header 1 transmitted on the network through bit by bit comparison of this header with one or more values which are particular to it and transmits the end of message 2 containing the information required by the master station which transmitted the header 1.

The message frame 3 thus formed contains at the same time the identification of the message and the corresponding information and thus forms a normal communication frame which can be interpreted by all the other stations connected to this network.

More specifically, if the communication network is a network which can have a dominant logic state and a recessive logic state, the master station transmits a message header 1 ending in a recessive bit 4 which the slave station can dominate by means of a dominant bit 5 in order to initialize its response.

The master station thus loses access to the network by conventional bit by bit property arbitration.

This process has already been described in the multi-master multi-slave systems and it is possible to generalize it in order to determine a process for hierarchized access so that each station concerned can have a determined ranking characteristic for ranking access to the network.

This ranking characteristic for access to the network is the number of bits already transmitted by another station before the station concerned can gain access to the network in order to transmit its own information.

In this definition, a master station is of a ranking of 0 insofar as it can itself initiate a message frame. On the other hand, the slave stations are of maximum ranking, that is to say, have a characteristic corresponding to the size of the information which makes it possible to totally identify the message.

This process for access to a network leads to embodiments which can differ according to the chosen technique for encoding the bits.

For the purposes of illustration, the most frequently used types of encoding are described in greater detail below, these types being:

PWM (pulse width modulation) encoding,

Manchester encoding,

NRZ (non-return to zero) encoding, and

NRZ (non-return to zero) encoding with bit stuffing.

The remainder of the description has been limited to a network, of which the mode of access among master stations is bit by bit arbitration on the message header, the network having only one dominant logic state and one recessive logic state.

PWM (pulse width modulation) encoding makes it possible to encode dominant bits and recessive bits, a recessive bit being formed from a dominant rectangular pulse followed by two recessive rectangular pulses, whereas a dominant bit is formed from two dominant rectangular pulses followed by a recessive rectangular pulse.

Figure 2:
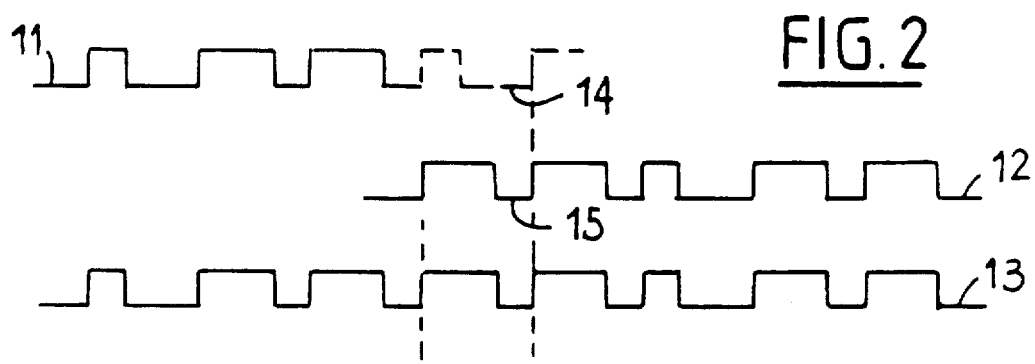
FIG. 2 illustrates the functioning of this process in the case of encoding by modulation of pulse width.

In this type of encoding, the station which has to effect a response in the frame comprising a header 11 (FIG. 2) and an end of message 12 which form a communication frame 13, simply has to dominate the recessive bit 14, which is transmitted by the master station after the header 11, by means of a dominant bit 15 which is in synchronism with this recessive bit of the header.

A slight desynchronization of the stations has no effect on the form of the signals of the frame.

On the other hand, if the encoding used is of the Manchester type, the analysis is different.

In fact, in L type Manchester encoding, which is the most suitable type for bit by bit arbitration, a recessive bit is a recessive rectangular pulse followed by a dominant rectangular pulse, whereas a dominant bit is a dominant rectangular pulse followed by a recessive rectangular pulse.

The station which has to effect a response in the frame must transmit a dominant bit in synchronism with the recessive bit of the header transmitted by the master station. Thus, the header 21 (FIG. 3) is combined with the end of message 22 in order to form the frame 23, by dominating the recessive bit 24, which is transmitted after the header 21, by means of a dominant bit 25 transmitted by the station which is to transmit its information on the network.

If the bit which precedes the recessive bit ends in a recessive rectangular pulse 26, a slight desynchronization between stations produces no effect on the resultant signal 23. On the other hand, and as can be seen more specifically in FIG. 4, if the bit which precedes the recessive bit ends in a dominant rectangular pulse 27, the resulting form of the signals at 23 depends upon the synchronization of the stations.

Thus, for example, if the station transmitting the response is transmitting in advance in relation to the header (FIG. 4), the new rectangular pulse only prolongs the dominant state of the preceding rectangular pulse 27. On the other hand, and as can be seen more specifically in FIG. 5, if the station transmitting its response is transmitting with a lag, the resultant signal may fall back into the recessive state for a short time before regaining the dominant state.

This parasite signal 28 can be partially concealed by the characteristics of the line transmitters/receivers, but can also not be detected by some of the stations which may then either detect an error or synchronize themselves on this parasite signal, which is to be avoided.

To this end, it is necessary that the dominant start of the response does not appear if the preceding rectangular pulse is dominant, that is to say that this start is only authorized if the preceding rectangular pulse is recessive.

This rule can be illustrated in the case in which the message header ends in two mode bits making possible the writing of data and the reading of data in a slave station. The last message identification bit will be called M0 below whereas the penultimate bit will be called M1.

In Manchester encoding, these bits will be characterized in the following manner:

M1 recessive, M0 recessive : writing request
M1 recessive, M0 dominant : writing
M1 dominant, M0 recessive : reading request
M1 dominant, M0 dominant : response in the frame to a reading request.

Figure 3:
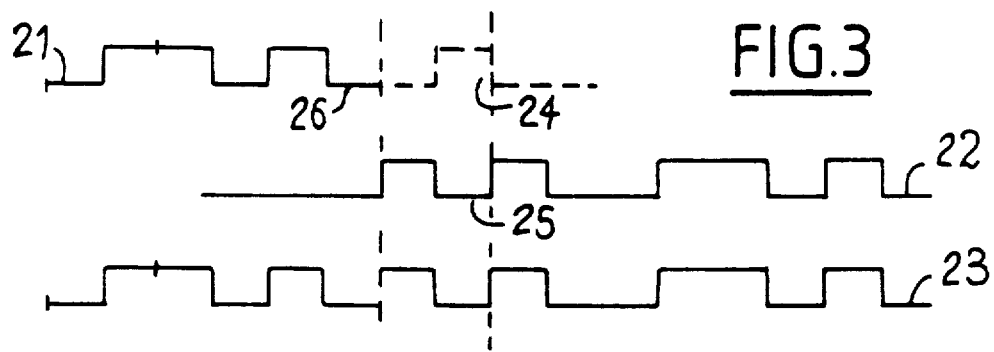
FIGS. 3, 4 and 5 illustrate the functioning of this process in the case of encoding of the Manchester type.
Figure 4:
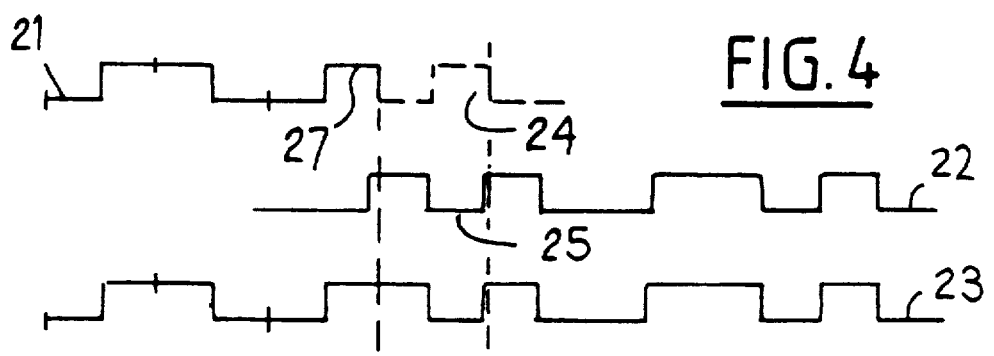
Figure 5:
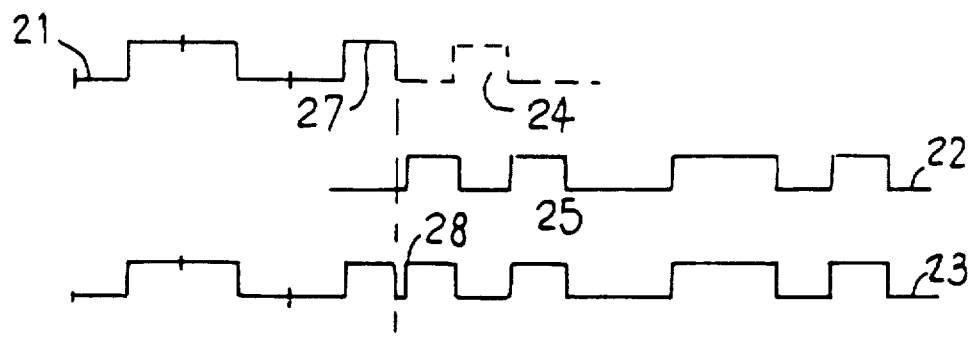
Figure 6:
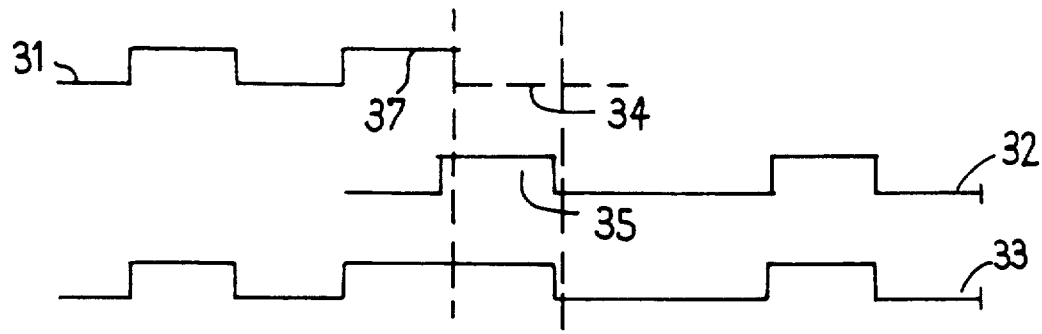
FIGS. 6 and 7 illustrate the functioning of this process in the case of NRZ encoding (non-return to zero)
Figure 7:
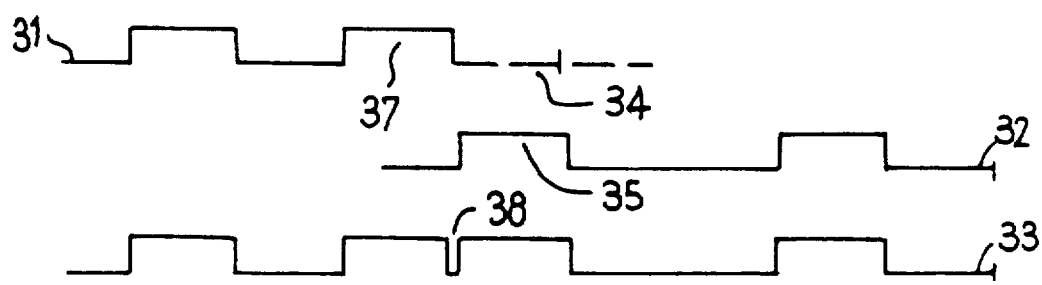

On the other hand, if, as represented in corresponding manner in FIGS. 6 and 7, in which the references 31 to 35 and 37 and 38 indicate signals which correspond to the signals 21 to 25 and 27 and 28 in FIGS. 3, 4 and 5 respectively, the encoding used is NRZ encoding in which each rectangular pulse represents a bit, the characterization of the mode bits is as follows:

M1 dominant, M0 recessive : writing request
M1 dominant, M0 dominant : writing
M1 recessive, M0 recessive : reading request
M1 recessive, M0 dominant : response in the frame to a reading request.

This makes it possible to respect the rule which states that the first dominant bit of the response is preceded by a recessive state, this state ending the header.

In the case in which the encoding is Manchester encoding, the last bit of the header is thus a dominant bit and in the case of NRZ encoding a recessive bit.

If the NRZ encoding is associated with a synchronization by bit stuffing, an additional constraint appears.

In fact, the bit stuffing mechanism consists in inserting, after a sequence of n bits of identical level, a bit of opposite logic value so as to create a transition which makes it possible for the receivers to preserve the bit synchronization of the message.

Upon reception, this special transition bit is of course eliminated.

This technique is on the other hand susceptible to errors, a disturbance of the network being able to give rise to a desynchronization of one or more bits.

Figure 8:
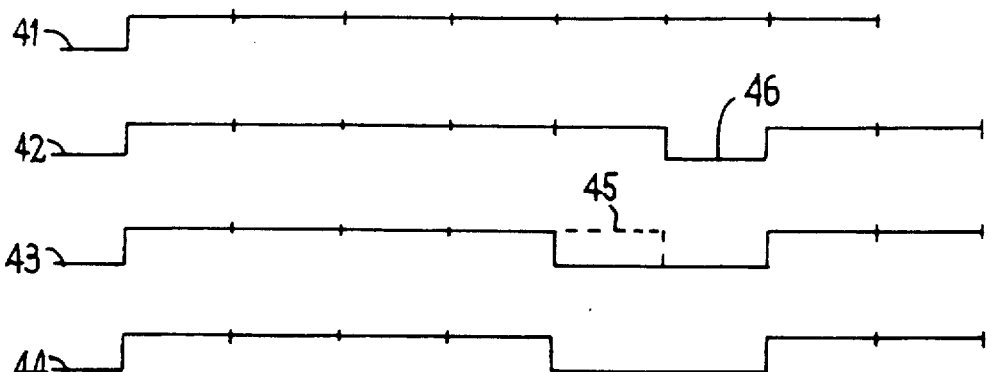
FIGS. 8 and 9 illustrate the functioning of this process in the case of NRZ encoding (non-return to zero) with bit stuffing.
Figure 9:
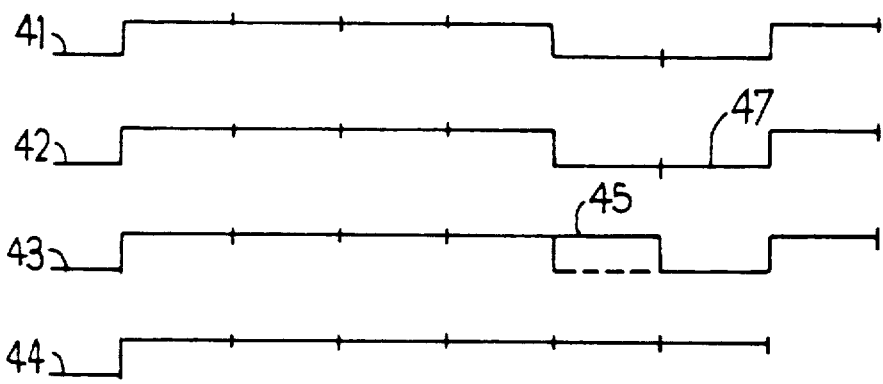

In FIGS. 8 and 9, examples have been shown in which the original signal to be transmitted is indicated at 41, the encoded signal according to the bit stuffing technique with n=5 is illustrated at 42, the disturbed signal is illustrated at 43, the signal which has been decoded by elimination of the bit stuffing is illustrated at 44, while the disturbed signal 43 comprises an erroneous bit 45.

The first example shown in FIG. 8 shows that the bit stuffing 46 has been received as a normal bit and as a result the reception has a lag of one bit.

On the other hand, the second example shown in FIG. 9 shows that a normal transmitted bit 47 has been received as a bit stuffing and as a result the reception is one bit in advance.

In a case of disturbance, the station effecting the response in the frame can thus be one bit in advance or have a lag of one bit.

In order to resolve these problems, it is preferable to frame the location of the dominant response bit by two recessive bits and the first dominant bit of the response is then preceded by a recessive level in accordance with the rule formulated above, a stagger of one bit of a unit being detected immediately since the frame is not consistent.

Figure 10:
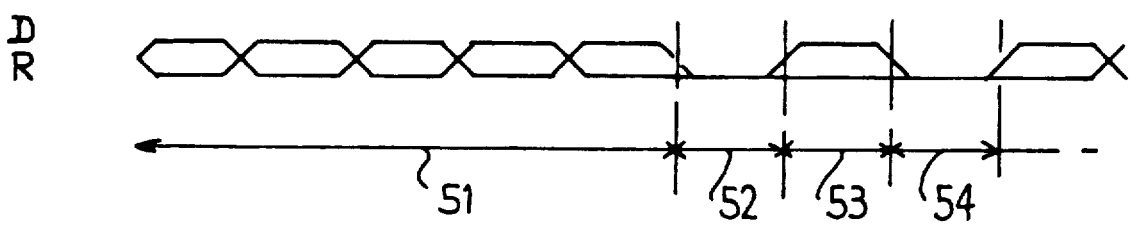
FIG. 10 illustrates a modified message frame in which the location of a dominant response bit is framed by two recessive bits.

In the case of a slave station, if the last response bit is the last bit of the message identifier, either bits of the identifier can be allocated or bits of fixed recessive value can be provided permanently in order to determine these states. In the latter solution, which is shown in FIG. 10, the sequence of the header bits comprises message identification bits 51, an identifier delimiter recessive bit 52, a question-response bit 53 and a question-response delimiter recessive bit 54.

Figure 11:
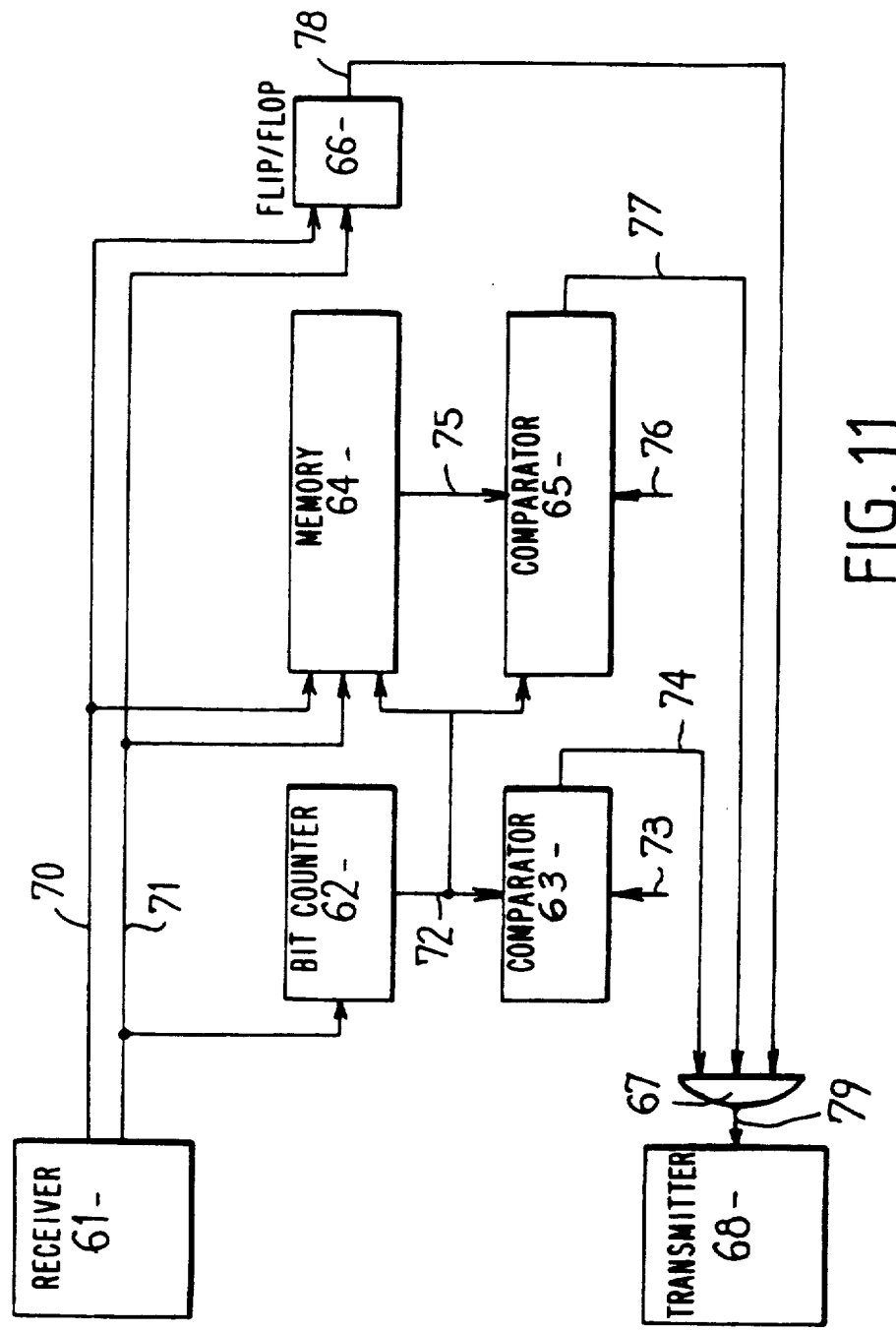
FIG. 11 shows an embodiment of a device for implementation of the process according to the invention.

In FIG. 11 an embodiment of a device is shown for the implementation of the process described above, for transmission of information by response in the frame. This device comprises a reception block 61, a bit counter 62, a block for comparison 63 of the counting of bits with a determined value r, a block for storage 64 of the header bits received, a block for comparison 65 of the header with one or more characteristic values of the station, a flip-flop for storage 66 of the preceding bit, a gate with three inputs 67 and lastly a transmission block 68 comprising a validation input.

The reception block 61 supplies the value of the bit received 70 as well as a clock 71.

This clock increments the counter 62 which carries out the counting of the bits. This counting value i is transmitted by means of a signal 72 to the different blocks connected to this counter, that is the blocks 63, 64 and 65.

Thus, this value is transmitted to the comparison block 63 in order to be compared with the value r 73, the output signal 74 of this block indicating whether the counting value i is greater than or equal to r. The signal 72 is also transmitted to the storage block 64 as well as to the comparison block 65.

The block 64 for storage of the header can be made starting from a flip-flop which is addressable by the signal 72 and which moreover requires as data inputs the signal 70 as well as the clock signal 71 originating from the reception block 61. The value of the header thus obtained is compared dynamically up to the bit of ranking i with the first i bits of one or more characteristic values 76 which are allocated to this station. The signal 77 which is derived from this indicates equality up to the ith bit.

The flip-flop 66 which receives the signal 70 and the clock signal 71 originating from the reception block 61, makes it possible to store the last bit value and optionally, according to the types of bit encoding, to use its direct or inverse output as a validation signal.

An output signal 78 from this flip-flop as well as the output signals 74 and 77 of the blocks 63 and 65 respectively are connected to the inputs of the AND gate 67 which supplies an input signal 79 for the authorization to carry out a response in the frame, this signal being applied to the input of the transmission block 68.

According to the applications, use can be made partially of the order of priority r for access to the network. Furthermore, either as a result of the impact on the allocation of bits in the message header, or because the priority r is the subject of programming by external pins, a limit of a smaller number of possible values can be imposed. For example, it is possible to define the ranking r modulo 4, which makes it possible to program on two external pins:

r = 0 master-type access
r = 4 access starting from the 4th bit
r = 8 access starting from the 8th bit
r = 12 slave-type access.

The different possible applications of this process and of this device can, for example, reside in:

the production of slave stations with response in the frame, the addressing of a block of stations, which it is desired to examine in parallel, for example, a set of stations comprising inputs by means of a keyboard. Thus, in the event of faults or of bad contacts, these stations can only transmit permanently if a master station requests them to by transmitting the first i bits of the header which are common to these stations, and the installation of stations on a treelike network comprising repeaters. A station which is placed on a terminal branch can only transmit after the repeaters are correctly positioned, directly or automatically, according to the first bits of the header of the message in course.

The invention claimed is:

1. A process for hierarchized access to a network for transmission of information in a communication frame, said communication frame including a message header, by response from stations connected to said network, comprising the steps of:

allocating to each station connected to the network a unique ranking characteristic for ranking access to the network, said ranking characteristic for access being the number and value of bits of a message header already transmitted by another station connected to the network before the station concerned can access said network in order to transmit information, receiving a number of bits transmitted by another station connected to the network, comparing said number and value of bits of a message header received to said ranking characteristic allocated to the station concerned, and transmitting information in response to said number of bits already received from another station connected to the network when said number and value corresponds to said ranking characteristic.

2. A process according to claim 1, wherein said message header ends in a recessive state.

3. A process according to claim 2, wherein NRZ type with bit stuffing encoding is used, and a first dominant bit of the response is framed by two recessive bits.

4. A process according to claim 1, wherein Manchester type encoding is used and, said message header ends in a dominant bit when a station addressed has to transmit a response.

5. A process according to claim 1, wherein NRZ type encoding is used, and said message header ends in a recessive bit when a station addressed transmits a response.

6. A device for enabling hierarchized access to a network for transmission of information in a communication frame by response from stations connected to said network, said device comprising:

a counter for counting bits transmitted on the network, a comparator, connected to said counter, for comparing the number and value of bits transmitted on the network with a characteristic value for the ranking for access allocated to the station, transmission means, connected to said comparator, for transmitting from the station information on the network by said station when the number of bits transmitted on the network is equal to or greater than the characteristic value allocated to the station and the value of the bits transmitted on the network equal the value of a number of bits of the characteristic value allocated to the station.

* * * * *